United States Patent Office
3,014,071
Patented Dec. 19, 1961

3,014,071
MANUFACTURE OF PERCHLOROMETHYL MERCAPTAN
Charles H. Hoyt, Camas, Wash., and Jonas Kamlet, New York, N.Y., assignors to Crown Zellerbach Corporation, San Francisco, Calif., a corporation of Nevada
No Drawing. Filed Nov. 7, 1958, Ser. No. 772,419
12 Claims. (Cl. 260—543)

This invention relates to a process for the manufacture of perchloromethyl mercaptan—$CCl_3SCl$. More particularly, this invention relates to a process whereby perchloromethyl mercaptan may be manufactured from cheap and readily available raw materials, in good yields, and without the necessity of separating it from undesirable concomitant co-products.

Perchloromethyl mercaptan—$CCl_3SCl$—is a yellow, malodorous liquid boiling at 146.5°–148.0° C./760 mm. Hg pressure, of density of 1.70–1.72, refractive index—$nD_{20}$—1.5484. It has derived commercial importance in the past several years as an intermediate in the manufacture of fungicides, bactericides, germicides, soil fumigants, pharmaceuticals, et cetera. (Kittleson, Science, 115, 84–86 (1952), Stoltz and Rogers, Soap and Sanitary Chemicals, June 154, 38–40, 109, Hamor, Journ. Amer. Pharm. Assoc., 46, #3 (1957), van der Kerk, U.S. Patent 2,790,-749 (1957), Kittleson, Agr. and Food Chem., 1, 677–9 (1953), Standard Oil Development Co., British Patent 666,636 (1952), Kittleson, U.S. Patent 2,653,155 (1953), U.S. Patent 2,713,058 (1955), Hawley, U.S. Patent 2,553,-774 (1951), Cohen, U.S. Patent 2,553,773 (1951), Kittleson, U.S. Patent 2,613,213 (1952), Pfleger, Angewandte Chemie, 65, 415–8 (1953), in the manufacture of diesel fuel additives (Nygaard et al., U.S. Patent 2,326,102 (1943), Seger et al., U.S. Patent 2,329,489 (1943), in the manufacture of lubricants (Badertscher et al., U.S. Patent 2,319,183 (1943), in the manufacture of dyestuffs (Argyle and Dyson, Journ. Chem. Soc. 1937, 1629–1634, German Patents 234,922 and 232,791, Rathke, Berichte 19, 395 (1886)), and for a wide range of other applications and uses.

Perchloromethyl mercaptan has heretofore been prepared by several methods. However, the process most widely used heretofore for the manufacture of perchloromethyl mercaptan involves the reaction of carbon bisulfide with chlorine in the presence of an iodine catalyst and preferably in the absence of sunlight or actinic radiations (Rathke, Annalen, 167, 198 (1873); Klason, German Patent 83,124; Organic Syntheses Collective, volume I, 506–510; Johnson and Hemingway, Journ. Amer. Chem. Soc., 38, 1554 (1916); Frankland, Challenger and Webster, Journ. Soc. Chem. Ind., 39, 257 T (1920); Dyson and Hunter, Journ. Soc. Chem. Ind., 45, 81 T (1926); Dyson and George, Journ. Chem. Soc. (London), 125, 1703 (1924); Autenrieth and Hefner, Berichte, 58, 2152 (1925); Helfrich and Reid, Journ. Amer. Chem. Soc., 43, 591 (1921)).

The reactions involved in the iodine-catalized chlorination of carbon bisulfide are:

$$2CS_2 + 5Cl_2 \rightarrow 2CCl_3SCl + S_2Cl_2$$
$$2CS_2 + 6Cl_2 \rightarrow 2CCl_3SCl + 2SCl_2$$

An undesirable side-reaction may give rise to carbon tetrachloride at the expense of perchloromethyl mercaptan formation, e.g.

$$2SC_2 + 8Cl_2 \rightarrow 2CCl_4 + 4SCl_2$$

At the conclusion of the chlorination, the reaction product consists of a mixture of perchloromethyl mercaptan, sulfur monochloride—$S_2Cl_2$—and sulfur dichloride—$SCl_2$. This reaction product is difficult, tedious and expensive to separate, and the separation and purification steps involved often nullify any advantage that might derive from the use of inexpensive carbon bisulfide as a starting material, and result in low final yields of perchloromethyl mercaptan. Such separation and purification procedures are described by Churchill in U.S. Patent 2,666,081 (1954), Pitt in U.S. Patent 2,647,143 (1953), Ohsol et al. in U.S. Patent 2,575,290 (1951), Kamlet in U.S. Patent 2,545,285 (1951) and U.S. Patent 2,664,442 (1953) and Jonas in German Patent 915,335 (1954).

It is the object of this invention to provide a convenient and economical process for the manufacture of perchloromethyl mercaptan by the chlorination of cheap and readily available raw materials, without the necessity of separating the end-product from concomitant co-products, especially the difficultly separable sulfur chloride.

The basis of the present invention is the finding that perchloromethyl mercaptan may be synthesized in good yield, and without concomitant sulfur chlorides formation, by the catalyzed chlorination of dimethyl disulfide $CH_3$—$S$—$S$—$CH_3$, intermediate chlorination products derived therefrom and chloro-dimethyldisulfides.

Dimethyl disulfide is a liquid, having a boiling point (760 mm.) of 109.6° C., and a density (20° C.) of 1.0625. It is readily obtained by the oxidation of methyl mercaptan (Pascal and Tarbell, Journ. Amer. Chem. Soc., 79, 6015–20 (1957)) and is potentially obtainable in huge quantities from alkaline pulp mill spent liquors (Goheen, U.S. Patent 2,840,614 (1958); Chemical Week, Jan. 7, 1956, 50–1; Chemical and Engineering News, Jan. 9, 1956, 172–3).

Numerous attempts have heretofore been made to chlorinate dimethyl disulfide, but none of these has led to the formation of perchloromethyl mercaptan. Thus, Brintzinger (German Patent 848,951 (1952), Berichte, 83, 87–90 (1950)) chlorinated dimethyl disulfide with a variety of chlorinating agents (chlorine, sulfuryl chloride, thionyl chloride, sulfur chloride) and obtained methyl sulfenyl chloride—$CH_3SCl$. By varying the reaction conditions, Brintzinger obtained chloromethyl sulfenyl chloride—$ClCH_2SCl$. Brower and Douglass (Journ. Amer. Chem. Soc., 73, 5787–9 (1951)) chlorinated dimethyl disulfide with elemental chlorine and obtained methyl sulfenyl trichloride—$CH_3SCl_3$. Riche, Annalen, 92, 356 (1854), chlorinated dimethyl disulfide and obtained a chlorine adduct $(CH_3)_2S_2Cl_2$. By the use of an excess of chlorine, Riche obtained bis(trichloromethyl) sulfide—$CCl_3SCCl_3$. However, none of the procedures of the prior art has succeeded in chlorinating dimethyl disulfide or its intermediate chlorination products to perchloromethyl mercaptan.

It was therefore completely surprising to find that perchloromethyl mercaptan could be obtained, in good yield, by the chlorination of dimethyl disulfide or other chlorinated substances mentioned hereinabove, in the presence of a trace of iodine as a catalyst, and at temperatures kept below 50° C., and preferably below 30° C. It is also desirable to effect this chlorination in the substantial absence of sunlight or actinic radiation.

It was also surprising to find that good yields of perchloromethyl mercaptan can be obtained from intermediate chlorination products derived from dimethyl disulfide in accordance with the chlorination procedure of this invention.

In the case of dimethyl disulfide the reaction involved is:

$$CH_3SSCH_3 + 7Cl_2 \rightarrow 2CCl_3SCl + 6HCl$$

The presence of the iodine catalyst seems to catalyze the further chlorination of the intermediate chlorination products (such as those obtained by Brintzinger, by Brower and Douglass, and by Riche) to form perchloromethyl mercaptan. In the absence of this iodine catalyst, little or no perchloromethyl mercaptan is formed.

Other substances which are suitable according to this invention are intermediate chlorination products derived from dimethyl disulfide, including methyl sulfenyl chloride, chloromethyl sulfenyl chloride, dichloromethyl sulfenyl chloride, methyl sulfenyl trichloride, chloromethyl sulfenyl trichloride and dichloromethyl sulfenyl trichloride.

Furthermore, there may be employed chloro-dimethyl-disulfides, including chlorodimethyl disulfide, bis-trichloromethyl disulfide and the intermediate chlorinated disulfides.

The amount of iodine used as a catalyst in conversion of dimethyl disulfide or any of the above mentioned chlorinated substances may vary over wide limits, e.g. from 0.001% to 1.0%, and preferably from 0.1% to 0.5% by weight of iodine based on the weight of the substance employed.

The chlorination can be carried out at temperatures maintained not in excess of 50° C., and preferably below 30° C. Above 50° C., a secondary reaction occurs, whereby the $CCl_3SCl$ formed is further chlorinated to carbon tetrachloride and sulfur chloride:

$$CCl_3SCl + Cl_2 \rightarrow CCl_4 + SCl_2$$

Best yields are obtained by maintaining the temperature during chlorination below 30° C.

Similarly, sunlight or actinic radiation catalyze the further conversion of the formed perchloromethyl mercaptan to carbon tetrachloride and sulfur chloride. It is therefore desirable to effect this chlorination in the absence of sunlight and actinic radiation, and preferably in a sealed, dark reactor.

The process of this invention is effected by dissolving the iodine catalyst in the dimethyl disulfide or other substances mentioned hereinabove, and thereafter passing chlorine gas through a sparger tube or diffuser plate, while maintaining the temperature by external cooling devices below 50° C., and preferably below 30° C. Although the bottom temperature value is not too critical, the chlorination should be effectuated above the freezing point of the reaction mixture, and preferably above about −40° C. The rate of chlorine addition is limited only by the speed with which the chlorine is absorbed (and this may be increased by efficient agitation) and by the efficiency of the cooling. During the chlorination, hydrogen chloride gas is evolved. This is piped off and may be recovered by absorption in water or otherwise employed or discarded.

When the required amount of chlorine has been absorbed, excess chlorine and HCl are swept from the reactor with a stream of nitrogen or carbon dioxide, and the perchloromethyl mercaptan is recovered, in good yield, by a simple fractionation, e.g. by recovering the fraction which distills at 80° C. to 85° C. at 100 mm. Hg pressure. Yields of 80% to 90% of the theoretical of perchloromethyl mercaptan, based on the dimethyl disulfide consumed, may be obtained by this procedure.

The following examples are given to define and to illustrate this invention, but in no way to limit it to reagents, proportions or conditions described therein. Obvious modifications and improvements will occur to any person skilled in the art.

*Example 1*

90.0 cc. (95.7 gms.) of technical dimethyl disulfide (1.0 mole) and 0.38 gm. of iodine (0.4% on the weight of the dimethyl disulfide) were cooled to about 0° C., and chlorine gas was introduced through a diffuser plate, in the complete absence of light, while cooling the reaction mixture to keep the temperature from rising above 30° C. The hydrogen chloride gas evolved was passed through a tall, water-cooled condenser, to condense and reflux any volatilized reagents back to the reaction vessel and the HCl evolved was absorbed in water. The chlorination was continued until the volume of the reaction mixture had reached 200 to 210 cc. This required about 24 hours of chlorination.

Excess chlorine and HCl were then swept from the reaction vessel with a stream of nitrogen gas, and the reaction mixture was then fractionated. The fraction distilling between 80° C. and 85° C. at 100 mm. Hg was pure perchloromethyl mercaptan. The yield of this fraction was 298.0 gms., or about 80% of the theoretical.

*Example 2*

The procedure described in Example 1 was repeated, except that 45 cc. of dimethyl disulfide and 0.19 gm. of iodine were employed and the chlorination was effectuated at a temperature of between about −30° C. and −35° C.

On distillation of the reaction mixture, the fraction distilling between 65° C. and 70° C. at 45–50 mm. Hg was perchloromethyl mercaptan in a yield of 103.4 gms. corresponding to about 79% of the theoretical. There was no methyl sulfenyl trichloride precipitate formed during chlorination.

*Example 3*

31 gms. of methyl sulfenyl chloride, prepared from dimethyl disulfide and sulfuryl chloride according to Brintzinger, Pfannstiel, Koddebusch and Kling, Ber., 83, 87–90 (1950), and 0.12 gm. of iodine were cooled to 0° C. and chlorine gas was introduced through a small tube in the absence of light. The temperature did not rise above 5° C. The hydrogen chloride gas evolved was passed through a tall, spiral condenser. The chlorination was continued for 24 hours. Excess chlorine and HCl were swept from the reaction vessel with nitrogen gas. The temperature went down to −10° as the gases were vaporized. 46.3 gms. of the reaction mixture was distilled through a 10-inch vigreux column. 37 gms. were collected between 50–60°/30 mm. pressure. 80% of the reaction mixture was perchloromethyl mercaptan.

*Example 4*

61 gms. of chloromethyl sulfenyl chloride, prepared according to Brintzinger, Pfannstiel, Koddebusch and Kling, Ber., 83, 87–90 (1950), from dimethyl disulfide and sulfuryl chloride, and 0.1 gm. of iodine were reacted as in Example 3. 98 gms. of the reaction product resulted and on distillation 79.6 gms. of perchloromethyl mercaptan boiling 50–60° at 30 mm. was obtained. This represents 81.5% yield based on the chloromethyl sulfenyl chloride.

*Example 5*

45 gms. of dichloromethyl sulfenyl chloride, prepared from s trithiane and chlorine by Douglas' modification of Wood's U.S. Patent 2,484,061, J. Org. Chem., 16, 1297–1302 (1951), and 0.06 gm. of iodine were chlorinated as in Example 3. 35.2 gms. of perchloromethyl mercaptan boiling at 50–60° C./30 mm. were collected from distillation of 44.7 gms. of the reaction mixture. The yield was 79% of the crude reaction mixture.

*Example 6*

37.9 gms. of methyl sulfenyl trichloride moist with chloroform, prepared from dimethyl disulfide according to Bower and Douglass, J. Am. Chem. Soc., 73, 5787 (1951), and 0.1 gm. of iodine were chlorinated as in Example 3. During the early part of the chlorination, the decomposition of the methyl sulfenyl trichloride gave off more heat than the chlorinations of Examples 3, 4, and 5. The temperature rose to 8° C. 22.4 gms. of crude product were formed and 19.5 gms. or 77.5% was recovered as perchloromethyl mercaptan at 50–55°/30 mm.

Having thus described our invention in preferred embodiments, what we claim and desire to protect by Letters Patent is:

1. A process for the manufacture of perchloromethyl mercaptan which comprises reacting with chlorine at least one substance of the group consisting of dimethyl disulfide, methyl sulfenyl chloride, chloromethyl sulfenyl chloride, dichloromethyl sulfenyl chloride, methyl sulfenyl trichloride, chloromethyl sulfenyl trichloride, dichloromethyl sulfenyl trichloride and chloro-dimethyldisulfides in the presence of a catalytic amount of iodine at a temperature not in excess of 50° C. in the substantial absence of sunlight and actinic radiation and thereafter recovering the perchloromethyl mercaptan from the reaction mixture.

2. The process of claim 1 in which said substance is dimethyl disulfide.

3. The process of claim 1 in which said substance is methyl sulfenyl chloride.

4. The process of claim in which said substance is chloromethyl sulfenyl chloride.

5. The process of claim 1 in which said substance is dischloromethyl sulfenyl chloride.

6. The process of claim 1 in which said substance is methyl sulfenyl trichloride.

7. The process of claim 1 in which the iodine catalyst is used in an amount of from 0.001% to 1.0% based on the weight of said substance.

8. The process of claim 1 in which the iodine catalyst is used in an amount of from 0.1% to 0.5% based on the weight of said substance.

9. The process of claim 1 in which the chlorination is effected at a temperature not in excess of 30° C.

10. The process for the manufacture of perchloromethyl mercaptan which comprises reacting with chlorine dimethyl disulfide in the presence of iodine catalyst used in an amount of from 0.001% to 1.0% based on the weight of the dimethyl disulfide at a temperature not in excess of 50° C. in the substantial absence of sunlight and actinic radiation and thereafter recovering the perchloromethyl mercaptan from the reaction mixture.

11. The process of claim 10 in which the iodine catalyst is used in an amount of from 0.1% to 0.5% based on the weight of the dimethyl disulfide.

12. The process of claim 10 in which the chlorination is effected at a temperature not in excess of 30° C.

References Cited in the file of this patent

UNITED STATES PATENTS 2,853,516     Louthan _____ Sept. 23, 1958

OTHER REFERENCES

Helfrich et al.: J. Am. Chem. Soc., 43, 591–594 (1921).
Groggins: Unit Processes in Organic Synthesis (1952), pp. 176–177.

UNITED STATES PATENT OFFICE

CERTIFICATION OF CORRECTION

Patent No. 3,014,071 December 19, 1961

Charles H. Hoyt et al.

It is hereby certified that error appears in the above numbered patent requiring correction and that the said Letters Patent should read as corrected below.

Column 5, line 13, after "claim" insert -- 1 --; line 16, for "dischloromethyl" read -- dichloromethyl --.

Signed and sealed this 24th day of April 1962.

(SEAL)
Attest:

ESTON G. JOHNSON
Attesting Officer

DAVID L. LADD
Commissioner of Patents